Sept. 14, 1965 C. PICOU 3,206,727
METHOD AND APPARATUS FOR PROCESSING MULTI-CHANNEL
SEISMIC RECORDS
Filed Jan. 18, 1962
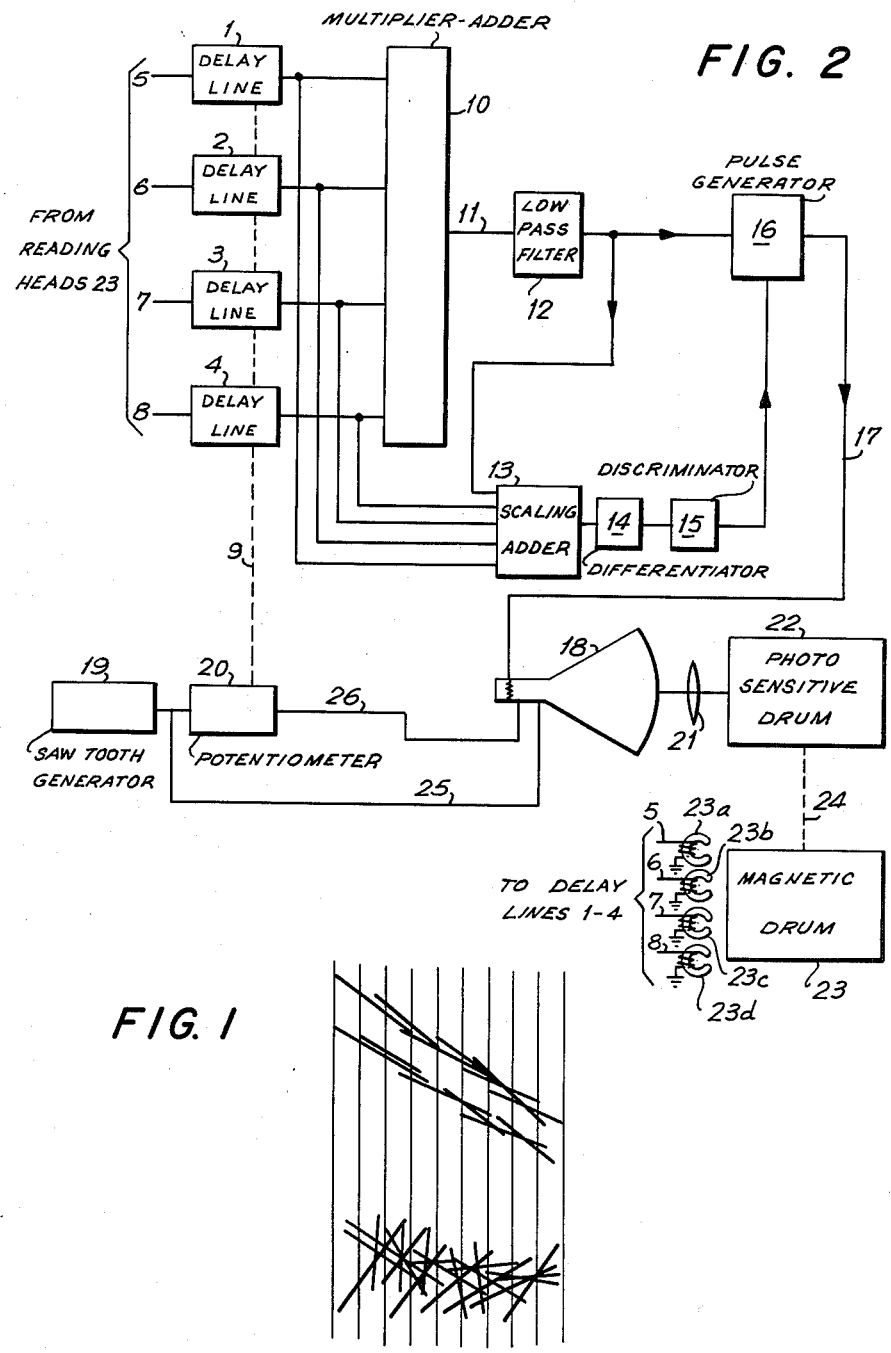

United States Patent Office 3,206,727
Patented Sept. 14, 1965

3,206,727
METHOD AND APPARATUS FOR PROCESSING MULTI-CHANNEL SEISMIC RECORDS
Claude Picou, Paris, France, assignor to Compagnie Generale de Geophysique, Paris, France, a corporation of France
Filed Jan. 18, 1962, Ser. No. 168,017
Claims priority, application France, Jan. 27, 1961, 850,916
2 Claims. (Cl. 340—15.5)

It is a well-known fact that seismic prospecting consists chiefly in defining the nature of the ground layers through examination of the effects of artificially produced seismic waves which are returned to the ground surface after reflection by or refraction in the boundary surfaces between said layers.

The operation will now be generally described:

At a point of the location to be examined, there is positioned a dynamite charge and at predetermined distances from said point, a number or seismometers are arranged, preferably along a straight line.

The explosion of the charge produces seismic waves which enter the ground and are refracted in or reflected by the heterogeneous discontinuities of the ground, after which they return to the ground surface and act on the different seismometers.

The information provided by a firing of such a charge is contained in practice in a number of records or traces, each trace corresponding to a predetermined seismometer.

The problem of processing the records or traces thus obtained consists in obtaining maximum information as to the nature of the ground through which the waves have passed.

It is a well-known fact that this examination of different traces can be improved through the synthesis of the ratio between signal and background noise. Such background noise can be produced by parasitic phenomena, said miniature reflections and also includes the noise produced by the amplifiers inserted between the seismometers and the recorders and the like. Such parasitic noises conceal and deform the useful signals which are alone capable of supplying interesting information.

It is a well-known fact that it is possible to operate so that so-called static and dynamic corrections are executed. The static corrections being required are ascribable to the following factors: firstly, the waves when they enter the ground initially at the point of explosion and when they return to ground surface, pass through a layer of loose ground in which the fundamental hypothesis of propagation of waves in a homogeneous ground region is generally no longer valid and, at any rate, the parameters governing such a propagation are not generally well known. Thus, the times of arrival of the seismic waves at the different seismometers differ slightly from those obtained in the case where the waves are propogated solely inside a ground layer for which such fundamental hypotheses are valid; and secondly, and generally speaking, the seismometers are not actually located on a straight horizontal line as a consequence of the slope of the ground and therefore it is necessary to resort to a further correction.

The dynamic corrections are due to the fact that the waves produced by the explosion are not plane waves, but spherical waves. Therefore, for the sake of convenience and simplicity in the illustration of the results, it is necessary to assign to each record dynamic corrections which depend on time and which allow correcting the modifications due to the spherical nature of the waves and providing data corresponding to plane waves.

When the static and dynamic corrections have been executed, it is still necessary to define the best correlation between the traces, so as to make a general chart forming a synthesis of the data supplied by the different traces.

It is an object of the invention to provide a refined method for ascertaining the best static and dynamic corrections.

It is a further object of the invention to provide a method for automatically drawing a general chart forming a synthesis of the information which may be derived from the records or traces as a whole.

I will first examine the problem of the static and dynamic corrections.

These corrections have for their object cancelling the influence of the two above-mentioned factors, with a view to obtaining, starting from the actually obtained traces, those traces which would be supplied by virtual seismometers arranged along a straight horizontal line located at the level of a ground layer assumed to be solid, that is by seismometers which are buried at such a lower level in the ground, the explosive charge being also buried at said level.

In practice, the operation is performed by shifting the different traces with respect to each other in a manner different from the natural setting obtained when recording the actual firing.

It is a well-known fact that seismic wave trains reach each seismometer at different times, by reason of the differences in durations of travel. The difference between the time durations of time of travel for two adjacent traces will be termed hereinafter the "time gradient."

Consequently, the static and dynamic corrections have for their object the allotting to each trace a value $\theta$ defining the correcting shift to be introduced in the time gradient of said trace, so as to cancel the influence of the two factors considered.

Said value $\theta$ cannot always be obtained through examination of the geometrical structure of the seismographic base, that is of the geometrical data defining the straight line joining the different seismometers, since the speed of propagation of the waves in loose ground cannot always be accurately ascertained. It is therefore generally necessary to find experimentally for each trace the optimum value of $\theta$.

In order to find the best static and dynamic corrections to be executed, my improved method includes defining the coefficients of similarity between two traces for a series of arbitrarily selected values of $\theta$, so that it may be possible to ascertain the optimum value of $\theta$ which is necessary to apply for the relative setting between two adjacent traces with respect to each other.

To this end and in accordance with an important feature of my invention, the numerical value of the coefficient of similarity is estimated and the curve defining the modification with time of the value of said coefficinet is drawn for a series of values of $\theta$. This allows the operator to select the value of $\theta$ which it is preferable to use, said value being that corresponding to the curve defining the coefficient of similarity which produces the most marked peaks.

In accordance with a further feature of my invention, this coefficient of similarity is taken equal to the value of the integral:

$$A = \int_{t-T}^{t} a(u) b(u+\theta) du$$

wherein $a(u)$ is the ordinate of a first trace at the time $u$ and $b(u+\theta)$ is the ordinate of the adjacent trace at the "time" $u + \theta$, $\theta$ having a predetermined arbitrary value.

The range of intergration T is chosen comparatively large, for instance of the order of 300 to 500 milliseconds.

It is possible also to resort to a mathematical equation of the type $$A = \int_0^t \left( e^{\frac{u-t}{T}} \right) \cdot a(u) \cdot b(u+\theta) \, du$$

which may be easily simulated by a conventional analog resistance and capacity circuit having a suitable time constant, for instance.

There is obtained thus a curve leading to a numerical estimation of the coefficient of similarity.

To each pair of traces and to each value of $\theta$, there corresponds a curve obtained through such a calculation; if there are $n$ traces or records, there are obtained $(n-1)$ curves of similarity coefficients for each value of $\theta$.

The system of curves corresponding to each of the various values of $\theta$ forms a family.

It is essential to calculate a number of families of curves, each family corresponding to a predetermined value of the integration constant T.

The operator is then capable of deducing from this system of curve families the optimum value of $\theta$ for each pair of traces, which allows setting said traces with respect to each other, that is, to execute static and dynamic corrections.

The different above-described operations may seem intricate and tedious, but, in practice, this is not actually the case and experience shows that different apparatus heretofore commercially available and which serve for analyzing and processing seismic records, are readily adaptable for the execution of the above-described operations and allow forming easily such families of curves.

It is thus apparent that my improved method allows defining accurately the optimum setting of the traces with reference to one another.

As a modification, it is possible to define the optimum value of $\theta$ by estimating numerically no longer a coefficient of similarity, but a coefficient of discordance, in which case the value to be taken for $\theta$ is that value of $\theta$ which produced the curve supplying the most marked troughs.

It is possible to take as values of the coefficient of discordance the value of the integral:

$$B = \int_{t-T}^{t} [a(u) - b(u+\theta)] \, du$$

or again:

$$B = \int_{t-T}^{t} [a(u) - b(u+\theta)]^2 \, du$$

the symbols appearing in said formula being those defined hereinabove.

The operations to be executed are the same as those already described.

Once said operations leading to the relative shifting of the traces have been executed, it is sufficient to define the best similarity to be established between the different traces, so as to produce a synthesis of the information supplied by the firing of the charge and to allow the operator to estimate the weight to be awarded to each particular coordinate of the different traces.

In otherwords, it is necessary to define the most probable slope of the different surfaces separating the underground layers, which surfaces produce a reflection of the waves, and to estimate the weight to be given to such information. It is a well-known fact that said slope corresponds to a predetermined value of the time gradient between adjacent traces. This gradient will be designated hereinafter by $\theta 1$.

My invention relates to an automatic method for estimating as well as possible said similarity and to eliminate the influence of the subjective behavior of the operator.

In conformity with my invention and by restorting to a method similar to that disclosed hereinabove, I estimate numerically a coefficient of similarity for a number of predetermined values of $\theta 1$ which allows then selecting the value of $\theta 1$ which supplies the best correlation.

It is preferable, without this being essential, to operate, in this case, with more than two traces, say four traces, and to adopt as a coefficinet of similarity the value of the expression:

$$\gamma = \sum_{m \neq n}^{a,b,c,d} 2mn = (a+b+c+d)^2 - (a^2+b^2+c^2+d^2)$$

$$= 2ab + 2ac + 2ad + 2bc + 2bd + 2cd$$

the letters $a$, $b$, $c$, $d$ designating the amplitudes of four successive traces, for instance, or else, traces spaced at uniform intervals two by two and arranged in their proper sequence respectively at the times:

$$t - \frac{3\theta 1}{2}, \; t - \frac{\theta 1}{2}, \; t + \frac{\theta 1}{2}, \; t + \frac{3\theta 1}{2}$$

In other terms, one obtains:

$$a = a\left(t - \frac{3\theta 1}{2}\right), \; b = b\left(t - \frac{\theta 1}{2}\right), \; c = c\left(t + \frac{\theta 1}{2}\right), \; d = d\left(t + \frac{3\theta 1}{2}\right)$$

Preferably, in order to cancel the background noise, I take as a criterion no longer the value of $\gamma$, but the value of its integral over a period of time T2, whereby it is possible to draw as a function of time the curve having as ordinates:

$$\Gamma = \int_{t-T2}^{t} \gamma \, dt$$

I also calculate as a function of time the sum $$\sigma = a + b + c + d$$

$a,b,c,d$, having the values referred to hereinabove, and its ordinates are multiplied by $\Gamma$, which supplies an auxiliary curve which I shall term the correlated trace, the ordinates of which in function of time have therefore the value $\sigma \times \Gamma$.

It is immediately apparent that the correlated trace thus obtained passes on the one hand through zero each time the sum $\sigma$ passes through zero and, on the other hand, it shows a drop in amplitude at the points where the similarity between the four traces $a$, $b$, $c$, $d$, taking into account the slope introduced by the value $\theta 1$, is particularly marked.

The trace obtained corresponds, on the one hand, to a predetermined combination of the four original seismic traces and, on the other hand, to a well-defined value $\theta 1$ and there is obtained naturally a family of such traces, each of which corresponds to a predetermined combination of traces and to a predetermined value for $\theta 1$.

It will be remarked that the value of T2 is, in this case, much smaller than the value of T1 which has served for obtaining optimum static and dynamic corrections. It is of advantage to take for T2 a value of the magnitude of 20 to 50 milliseconds.

As a modification, I may use for the value of the correlation coefficient, no longer the value $\Gamma$ defined hereinabove, but a value $\Gamma'$ which results from a summation with decreasing coefficients, which is a function of the previously treated information. It is possible to resort, for instance, to the integral:

$$\Gamma' = \int_0^t e^{\frac{u-t}{T}} \cdot \gamma(u) \, du$$

This is obtained easily in an electric computer by introducing an RC circuit having, for instance, a suitable time constant.

It is also possible to use, in a more general manner, a correlated trace $\Gamma'$ obtained through the filtering of the voltage $\gamma(t)$ through a low-pass which allows only the frequencies ranging between 0 and $\eta$ cycles per second to pass. The value of $\eta$ cycles per second should then be selected as lower than twice the lower seismic frequency appearing in the original record.

The original traces supplied by the firing of a charge appear after the shifting corresponding to static and dynamic corrections as a chart carrying a series of curves arranged from the top to the bottom of a sheet with a uniform spacing between them, the abscissae being proportional to time and the ordinates to the voltages collected and consequently the lines, having zero ordinates on the different traces, are equidistant.

The cross-section of the correlated film in which is condensed in conformity with the invention all the information which may be derived from the original traces is obtained as follows:

(a) In a first embodiment, for a predetermined number of uniformly spaced instants of time $t$, there is impressed over said film section a pseudovector whose center is located on the axis of the trace considered at the point corresponding to the instant $t$ and the slope of which defines the selected value of $\theta 1$. Said pseudovectors have a narrow and uniform breadth. By pseudovector is meant a tracing of uniform thickness and length which is imprinted at a given instant.

Said impression is all the blacker, that is, it is all the more marked when the similarity at said point as measured by the ordinate of the correlated trace, corresponding to the group considered of original traces for a value $\theta 1$ considered, is better.

This is obtained readily by operating through photographic techniques, the amount of light projected for printing the pseudovector being proportional to the ordinate of the correlated trace corresponding to said combination and to said value of $\theta 1$.

Preferably, the length of each of said pseudovectors is selected as equal to a small multiple, said three or four times, the distance separating the axes of two consecutive traces.

It is readily apparent and this is confirmed by experience, that in the case where the seismic waves have been subjected to a clean reflection, the outline of said pseudovector appears as shown in the upper section of FIG. 1 of the accompanying drawings, which figure shows clearly the general angular setting of the different pseudovectors, that is the slope with a clean separation between the successive pseudovectors.

In contradistinction, a parasitic noise area is characterized by the absence of a preferential direction for the recorded pseudovectors, which leads to a statistic greyish impression, as shown in the lower part of FIG. 1.

In the above-defined method, the pseudovectors are impressed systematically at predetermined times;

(b) it is possible, as a modification, to improve the method by printing the vectors only at the times where the value of $\Gamma'$ passes through a maximum, or else, only at the times where the sum passes through zero, or again, at the times of the passage through a maximum of a linear combination of the type $\Gamma' + \lambda \sigma$ where $\lambda$ is an adjustable parameter, i.e., a parameter selected in advance which then remans constant for a whole series of calculations;

(c) as a further modification, it is also possible to make the intensity of the impression of the vector proportional to $\Gamma$ or $\Gamma'$ instead of the product $\Gamma \lambda \sigma$;

(d) in accordance with a last, particularly important modification, it is possible to impress no longer pseudovectors of a constant thickness and of a variable density, but pseudovectors of a constant previously selected density, whereas their thickness varies for instance as a function of the value of $\Gamma'$; the result obtained by this latter modification is of particular interest inasmuch as, of all the pseudovectors recorded, it is that which has the largest thickness, that is that which corresponds to the best correlation, which conceals and wipes out through its sole presence the other, thinner pseudovectors, which latter correspond to correlations which have a lesser value and to which consequently less credit is to be allotted.

It will be remarked that the different calculations and operations referred to hereinabove, may be executed automatically; the apparatus and circuits for executing said calculation such as multiplication, integration, filtering and smoothing and said operation such as modifications of the pseudovector intensity and breadth and angular setting of the pseudovectors, recording of said pseudovectors on a photographic film, are well-known in the art.

It is also to be remarked that the modifications referred to as concerns at (b) the time of printing each vector, at (c), the magnitude adapted to modulate the pseudovectors and at (d) the type of modulation of the pseudovectors, may be associated in a cumulative manner, i.e., they may be combined.

In the accompanying drawings:

FIG. 1 is an explanatory graph showing tracings of the pseudovectors;

FIG. 2 is a block diagram of apparatus for executing the invention.

In the apparatus illustrated in FIG. 2, I resort to the above-mentioned modification $b$ and I operate with the linear combination $\Gamma' + \lambda \sigma$, i.e., the impression or printing is performed with pseudovectors having a constant density or intensity and a line thickness or width varying with the values of $\Gamma' + \lambda \sigma$ (modification $d$).

1, 2, 3, 4 designate delay lines which allow shifting in time the application of voltage to their inputs and are fed respectively by the channels 5, 6, 7, 8, said shiftings having the above-mentioned values:

$$-3\frac{\theta 1}{2}, \ -\frac{\theta 1}{2}, \ +\frac{\theta 1}{2}, \ +3\frac{\theta 1}{2}$$

A delay which is negative, that is, in practice, a lead for one line is, as a matter of fact, obtained by action on the other lines or traces. While a negative delay or advance may not in practice be obtained by a conventional circuit, it should be apparent that it can be achieved by delaying the other signals by the equivalent amount of time and leaving the "negative" delayed signal untouched. The adjustable value of $\theta 1$, is obtained by a single control system illustrated symbolically by the interrupted line 9. The delay lines may be of the variable type and are ganged to a shaft represented by line 9.

The voltage at the output ends of the delay lines 1, 2, 3, 4 are fed into a multiplier-adder 10 which calculates the products $2mn$ and adds these products together, so that, at the output of 10, that is of the lead 11, there is obtained the value of $\gamma$. In other words, the multiplier-adder 10 is an analog computer circuit having six analog multipliers of conventional design whose outputs are fed to six inputs of a conventional analog adder. If the voltage outputs of the delay lines 1, 2, 3, and 4 are considered as $a$, $b$, $c$, and $d$, the six multipliers form the following products $2ab$, $2ac$, $2ad$, $2bc$, $2bd$, $2cd$, and the adder forms the sum $2ab+2ac+2ad+2bc+2bd+2cd$.

The voltage on lead 11 is fed into a filter 12 which is a low-pass filter, whose cut-off frequency is adjustable between 16 and 32 cycles. Its response is practically that of an integrator, whose integrating time constant has the value T2.

$T2 = 60$ milliseconds when $\Gamma = 16$ cycles.

$T2 = 30$ milliseconds when $\Gamma = 32$ cycles.

There is consequently obtained at the output of filter 12 the value of $\Gamma'$, that is the value of the similarity coefficient.

The voltages at the output ends of the filter 1, 2, 3, 4, on the one hand, and at the output of filter 12, on the other hand, are added, after an adjustable magnification ratio $\lambda$ has been applied between the first-mentioned and the second-mentioned voltages, by means of scaling adder 13 supplying consequently across its output terminals the voltage forming the linear combination referred to hereinabove $\Gamma' + \lambda \sigma$ as mentioned hereinabove at ($b$). Scaling adder 13 may merely be a two input analog adder wherein one of the inputs includes a potential divider for scaling down its input by an appropriate constant, and a four input analog adder whose four inputs receive respectively the outputs of delay lines 1, 2, 3 and 4 respectively and whose output is connected to the scaling down input of the two input analog adder. Said value of the voltage serves in the modification considered for the release of the pseudovector impression.

In order to define the maximum value of said voltage, I resort to a differeniator 14 which is fed with the output voltage of 13. The output voltage of said differentiator 14 feeds a discriminator 15 which delivers, across its output terminals, a pulse each time the output voltage of the differentiator 14 passes through a zero value.

The output voltage of filter 12 is also fed into the input of the pulse generator 16 which is also controlled by the impulse voltage produced by discriminator 15. Pulse generator 16 generates rectangular voltage signals, the breadth of which depends on the instananeous value of the signal at the output end of the filter 12, the beginning of one rectangular signal registering with the production of a pulse at the output end of descriminator 15. Pulse generator 16 may be a conventional pulse generator as employed in pulse width modulating systems. It is therefore possible to obtain at the output end of generator 16, that is in the lead 17, a rectangular pulse each time the voltage across the terminals of differentator 14 passes through zero and this pulse has a duration defined by the value at said moment of the output voltage fed by filter 12.

The lead 17 is connected with the control grid of a cathode ray tube 18. The deflecting means, whether electrostatic or electromagnetic, of said cathode ray tube, are fed with the periodical saw tooth voltages from a sawtooth generator 19 operating at a suitable frequency. Said deflecting means are not illustrated for sake of clarity of the drawing.

The sawtooth output voltage of the generator 19 feeds, on the one hand, the horizontal deflecting means through the connection 25 and also the vertical deflecting means, through the connection 26, after a reduction or a multiplication of its amplitude by an amount defined by the gain control member 20 which may be a potentiometer. Said member 20 is controlled by the shaft 9 which serves by virtue of its coupling to variable delay lines 1, 2, 3, 4 for defining, as already mentioned, the lag introduced by delay lines 1, 2, 3, 4, so that the reducing or amplifying factor referred to for the vertical deflecting means, depends on the value of the gradient $\theta 1$.

It is immediately apparent that the slope of the straight line drawn by the spot on the screen of the cathode ray tube, is consequently a function of the gradient $\theta 1$; since the slope of the straight line drawn by the spot on the screen, depends on the ratio between the amplitudes of the deflecting voltages.

In practice, the magnitude of horizontal deflection has preferably an unvarying value which is adjusted before operation as a function of the spacing between the successive seismic records, whereas the value of the vertical deflecting voltage is proportional to the value of $\theta 1$.

Since the pulse fed by the lead 17 into the grid of the cathode ray tube 18 lasts during a time proportional to $\Gamma'$, this results in that the tube screen receives the electronic beam during a time proportional to the value of the similarity or correlation factor.

The curve appearing on the screen is transferred by an optic system illustrated symbolically by the lens 21 onto a photosensitive drum 22 carrying a photographically sensitive paper, which drum rotates at a uniform speed driven by shaft 24 in unison with a magnetic drum 23 carrying a magnetic strip. There is thus drawn consequently on the sensitive paper a line, the thickness of which along the time axis is proportional to $\Gamma'$.

The magnetic drum 23 is associated with reading heads 23a, 23b, 23c and 23d which supply, after demodulation if required, the voltages $a$, $b$, $c$, $d$ recorded thereon and which are fed to the delay lines 1, 2, 3, 4.

Preferably, the photosensitive drum 22 and the magnetic drum 23 rotate in synchronism, which synchronism is obtained very simply by keying them to a common shaft 24.

For a same group of four records, or traces, it is possible to execute as many photographic impressions as there are slopes, that is scanned values of $\theta 1$. Said photographic impressions which are superposed in succession, are obtained during as many successive revolutions of the two interconnected drums, that is the magnetic drum 23 carrying the magnetic strip and the photosentive drum 22.

Experience shows that, in accordance with the above procedure provided for the release of illuminating pulses, said releases are obtained at the same times and at each revolution for the different values of the slope and only the thickets pseudovectors remain finally apparent, which pseudovectors are those of which the angular setting corresponds to a maximum similarity.

These different operations being obtained for the combination of the four seismic records considered, the next group of traces is dealt with in the same manner, the operations described being repeated.

Such a group of records may be illustrated by the records, the numeric orders of which $$n, n+p, n+2p, n+3p$$

Wherein the values of $p$ used in practice $p=1$ or $p=2$. The group following said group may be $$m, m+p, m+2p, m+3p$$

wherein $m=n+k$, the most generally used values of $k$ being 1, 2 and 4.

The succession of these different elementary operations is controlled preferably by an automatic programming system which includes, in particular, rotary switches or selectors which are required for the energization of the different groups of records, taking into account the different slopes. From the standpoint of the resulting record, the different vectors corresponding to all the seismic records obtained after a succession of explosions, say 4 to 12, in practice, are grouped on a single document having the same breadth as the photographic drum, say 40 cm. in the present case.

It may be mentioned that the impressed lines or pseudovectors which are particularly dark at the location of the different input points of the seismic energy, are interconnected and form extensions of one another on the final photographic document and they show in a continuous manner the different levels which correspond to said inputs of energy and in similarity with geological cross-sections, the final document obtained may be called a "vectorial cross-section."

What is claimed is:

1. A method for processing seismic recordings in a plurality of channels comprising the steps of delaying the recordings different integral time intervals with respect to each other, arithmetically combining said recordings to produce composite representations of said recordings, transducing said composite representations of said recordings to intensity modulated straight line visual representations wherein the intensity of said straight lines is in accordance with the waveforms of said composite representation and the direction of said straight lines is in accordance with the time interval of delay, and photographing said straight line visual representations.

2. Apparatus for processing seismic records, wherein seismic waves from differenet sources are recorded on different channels of a record medium comprising a plurality of reading means for reading the recordings on the different channels and producing signals from said recordings, a plurality of delay means responsive to one of said reading means, respectively, for delaying said signals by equal successive predetermined intervals of time, multiplier-adder means for multiplying the amplitudes of said delayed signals in pairs and for summing the products obtained by said multiplications to provide a first composite signal, a low-pass filter means for receiving said first composite signal and for transmitting a filtered composite signal, signal adding means for adding the amplitude of said filtered composite signal and the amplitudes of said delayed signals to provide a second composite signal, differentiator means for differentiating said second composite signal to provide a differentiated composite signal, discriminator means for receiving said differentiated composite signal and for transmitting a trigger pulse each time said differentiated composite signal reaches zero amplitude, rectangular pulse generating means responsive to said trigger pulse and said filtered composite signal for generating a rectangular pulse for each received trigger pulse, said rectangular pulse having a duration proportional to the amplitude of said filtered composite signal, cathode ray tube means including a screen, a control grid, horizontal deflecting means, and vertical deflecting means, means for connecting said control grid to said rectangular pulse generator means, deflecting signal generating means for generating deflection signals, control means for receiving said deflection signals and for transmitting different proportions of said deflecting signals to said horizontal and vertical deflecting means respectively, the ratio of the different proportions of said deflecting signals being directly related to the intervals of time delay introduced by said delay means, and means for photographically recording the curves appearing on the screen of said cathode ray tube.

No references cited.

BENJAMIN A. BORCHELT, *Primary Examiner.*

CHESTER L. JUSTUS, SAMUEL FEINBERG,
*Examiners.*